United States Patent [19]

Tone

[11] Patent Number: 4,713,752
[45] Date of Patent: Dec. 15, 1987

[54] BUFFER STORAGE SYSTEM

[75] Inventor: Hirosada Tone, Fuchu, Japan

[73] Assignee: Fujitsu Limited, Kawasaki, Japan

[21] Appl. No.: 678,684

[22] Filed: Dec. 5, 1984

[30] Foreign Application Priority Data

Dec. 7, 1983 [JP] Japan .............................. 58-231104

[51] Int. Cl.[4] .............................................. G06F 9/36
[52] U.S. Cl. .................................................. 364/200
[58] Field of Search ... 364/200 MS File, 900 MS File

[56] References Cited

U.S. PATENT DOCUMENTS

| 4,354,232 | 10/1982 | Ryan ..................... | 364/200 |
| 4,467,414 | 8/1984 | Akagi et al. ............ | 364/200 |
| 4,502,110 | 2/1985 | Saito ..................... | 364/200 |
| 4,551,797 | 11/1985 | Amdahl ................. | 364/200 |
| 4,551,799 | 11/1985 | Ryan et al. ............. | 364/200 |
| 4,583,163 | 4/1986 | Kobayashi et al. ...... | 364/200 |

OTHER PUBLICATIONS

Electronics International, vol. 55, No. 16, Aug. 1982, pp. 112-117, New York, U.S.; P. Knudsen: "Supermini Goes Multiprocessor Route to Put It Up Front in Performance", p. 113, right-hand column, lines 23-33; p. 116, right-hand column, lines 11-26; p. 117, figure: For a Write Operation.

Computer Surveys, vol. 14, No. 3, Sep. 1982, pp. 473-530, New York, A. J. Smith: "Cache Memories", p. 503, right-hand column, line 49-p. 55, left-hand column.

IBM Technical Disclosure Bulletin, vol. 23, No. 1, Jun. 1980, pp. 262-263, New York, F. T. Blount et al.: "Deferred Cache Storing Method."

Primary Examiner—David Y. Eng
Attorney, Agent, or Firm—Staas & Halsey

[57] ABSTRACT

A buffer storage system for a pipeline processor, set up with at least an operand access buffer storage and an instruction fetch buffer storage. The buffer storages cooperate with store address registers and store data registers, to assume a store-through method between the buffer storages and a main storage. A feedback means is mounted between the buffer registers and the store address/data registers. This feedback means is activated during an operand store operation to apply an operand store address and an operand store data, from the store address and store data registers, to the instruction fetch buffer register for effecting coincidence in data among the storages.

14 Claims, 16 Drawing Figures

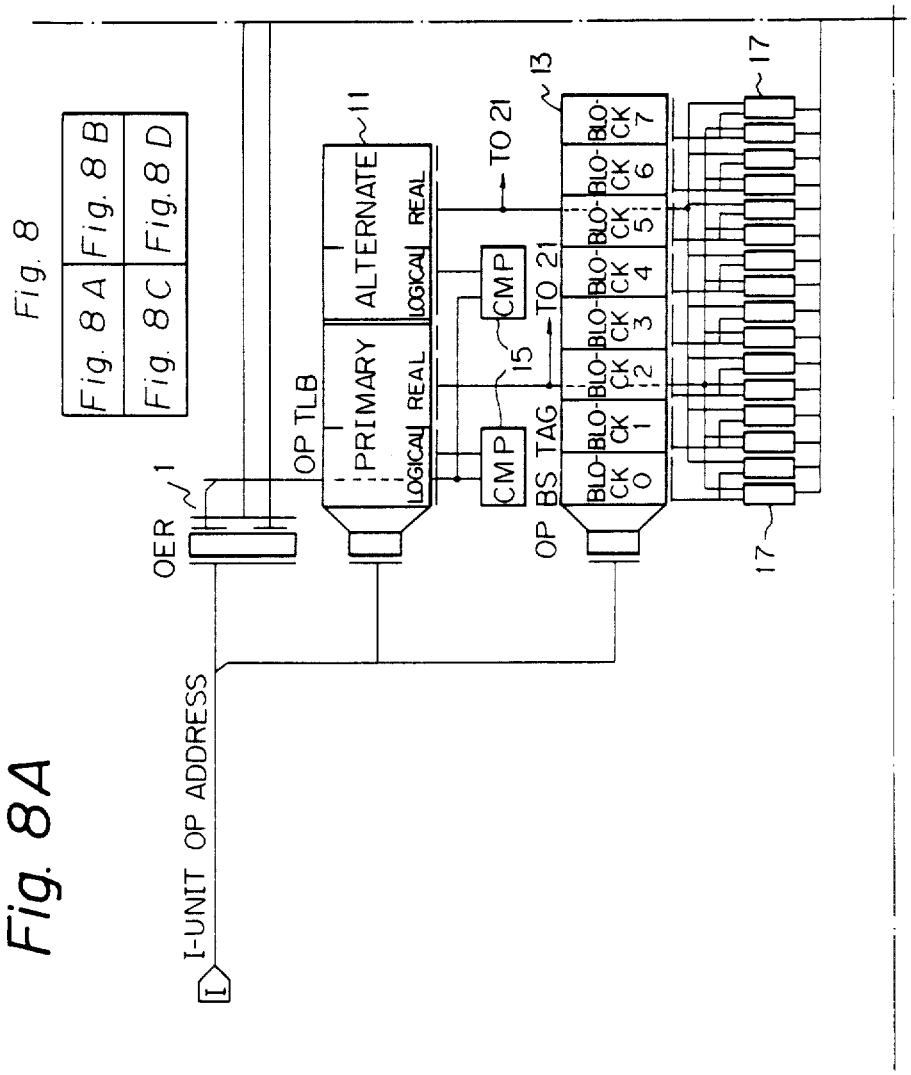

Fig. 9

|  | FR | STAR | STDR | BMR |
|--|--|--|--|--|
| STB 1 | VR | STB ADDRS 1....28 | STB DATA 0......28 | BM 63.......0....7 |
| STB 2 | VR | STB ADDRS 1....28 | STB DATA 0......28 | BM 63.......0....7 |
| STB 3 | VR | STB ADDRS 1....28 | STB DATA 0......28 | BM 63.......0....7 |
| STB 4 | VR | STB ADDRS 1....28 | STB DATA 0......28 | BM 63.......0....7 |

BUFFER STORAGE SYSTEM

BACKGROUND OF THE INVENTION

The present invention relates to a buffer storage system in a data processing apparatus and, more particularly, it relates to a buffer storage system including therein both a buffer storage for accessing operands and a buffer storage for fetching instructions, separately.

Recent increases, in the capability of a data processing apparatus, have led to attempted use of a variety of data-processing methods for coping with this increased capability. In one of these methods, namely the pipeline method, each sequence for executing an instruction is divided into a plurality of phases and each of the phases is executed at each station. This enables operations at respective stations to be achieved independently, and a plurality of instructions to be executed simultaneously.

In the prior art buffer storage system, both the pipeline set up in the operand access buffer storage, and the pipeline set up in the instruction fetch buffer storage, must be synchronized with each other. To strictly maintain such synchronization, often several operand access cycles must be left idle until several instruction fetch cycles with high priority are completed. This will be clarified in detail hereinafter. However, this leads to the problem in that the effective operating speed of the data processing apparatus cannot be made sufficiently high, due to the insertion of the above-mentioned idle operand access cycles, and therefore, the capability of the data processing apparatus cannot be increased to any large degree, even though independent buffer storages for accessing operands and fetching instructions are introduced.

SUMMARY OF THE INVENTION

It is an object of the present invention to provide a buffer storage system in which no synchronization is needed between the pipeline for the operand access buffer storage and the pipeline for the instruction fetch buffer storage.

The above object is attained by effecting a feedback of both an operand store access address and an operand store data from the operand access buffer storage to the instruction fetch buffer storage through a store buffer inherent to a data processing apparatus operated under the so-called store-through method.

BRIEF DESCRIPTION OF THE DRAWINGS

The present invention will be more apparent from the ensuing description with reference to the accompanying drawings, wherein:

FIGS. 8A to 8D show a detailed circuit diagram of the buffer storage system shown in FIG. 7;

FIG. 9 is a schematic illustration of the store buffer register;

DESCRIPTION OF THE PREFERRED EMBODIMENTS

Before describing the preferred embodiments, a discussion will be made of a prior art buffer storage system.

Figure 1:
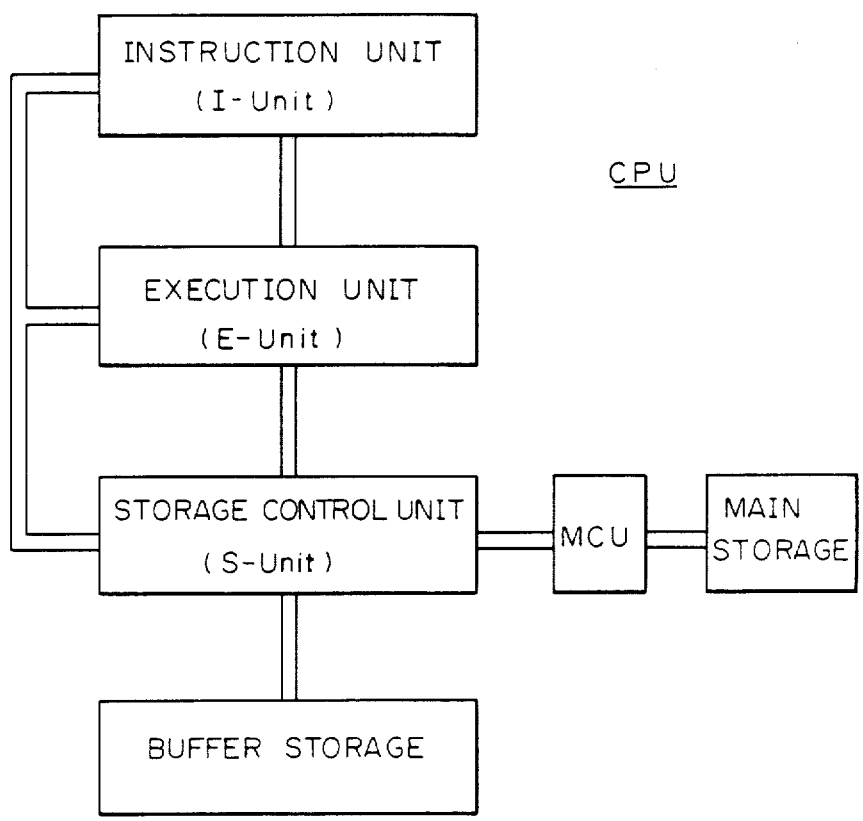
FIG. 1 is a general block diagram of a data processing apparatus according to the present invention.

FIG. 1 is a general block diagram of a data processing apparatus according to the present invention. It should be understood that FIG. 1 shows a major portion only of the data processing apparatus, i.e., a central processing unit (CPU). The CPU is constructed of three functional blocks and two storage portions. The first of the three functional blocks is an instruction unit (I-Unit) which operates to decode each instruction and to thereby control the pipeline, as a whole. The second is an execution unit (E-Unit) which performs logic and/or arithmetic operations to be executed. The third is a storage control unit (S-Unit) which operates to control accesses for the aforesaid two storage portions, i.e., a buffer storage and/or a main storage. The main storage is connected with the S-Unit, via a main storage control unit (MCU), however, it can be connected therewith directly without going through the MCU. In the CPU of FIG. 1, the present invention is mainly directed to the storage control unit (S-Unit).

Figure 2:
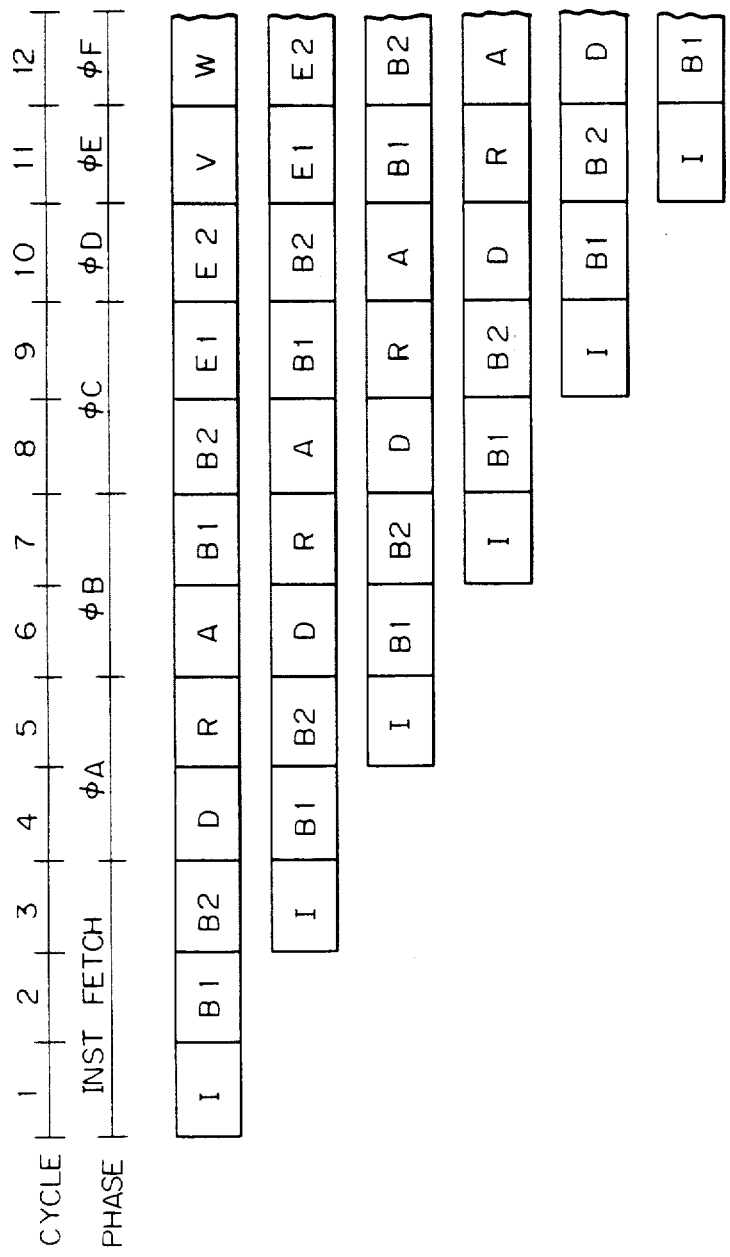
FIG. 2 depicts timing charts explaining the operations of a CPU pipeline with the use of a known storage control unit (S-Unit)

FIG. 2 depicts timing charts explaining the operations of the CPU pipeline when a known storage control unit (S-Unit) is used, for clarifying the role to be played by such a known S-Unit. Once an instruction is read from the buffer storage in an instruction fetch phase (INST FETCH), the instruction is processed through six phases, $\phi A$ to $\phi F$. Each phase is usually segmented into one, two or three cycles. The following work is allotted to the respective cycles.

I: Address calculation for instruction fetch,
B1: Buffer storage access for instruction fetch at a first cycle,
B2: Buffer storage access for instruction fetch at a second cycle,
D: Instruction decode,
R: Register read,
A: Address calculation for operand access,
B1: Buffer storage access for operand at a first cycle,
B2: Buffer storage access for operand at a second cycle,
E1: Execution of operation at a first cycle,
E2: Execution of operation at a second cycle,
V: Check operation,
W: Write operation.

Figure 3:
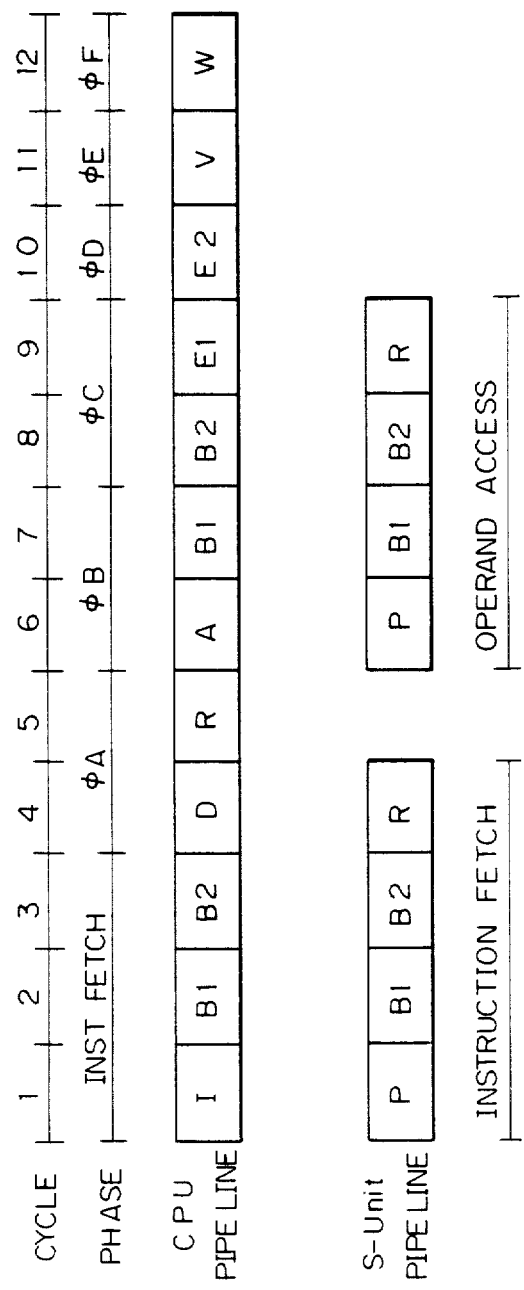
FIG. 3 depicts timing charts explaining access operation to the buffer storage.

FIG. 3 depicts timing charts explaining the access operation accessing the buffer storage. The upper horizontal pipeline stream corresponds the CPU pipeline and the lower horizontal pipeline stream to the S-Unit. In the S-Unit pipeline, each of the instruction fetch operation and the operand fetch operation is completed within four cycles. The following work is allotted to the respective cycles in the S-Unit pipeline.

P: Determination of priority for occupying the buffer storage,
B1: Buffer storage access at a first cycle,
B2: Buffer storage access at a second cycle,
R (at cycle 4): Transfer of the resultant read data by access to the I-Unit,
R (at cycle 9): Transfer of the resultant read data by access to the E-Unit.

As seen from FIG. 3, the buffer storage access is usually activated two times, i.e., at the cycles "I" and "A", for each instruction along the CPU pipeline, and thus, there is a possibility of conflict in effecting the buffer storage accesses. This will be further analyzed below.

Figure 4:
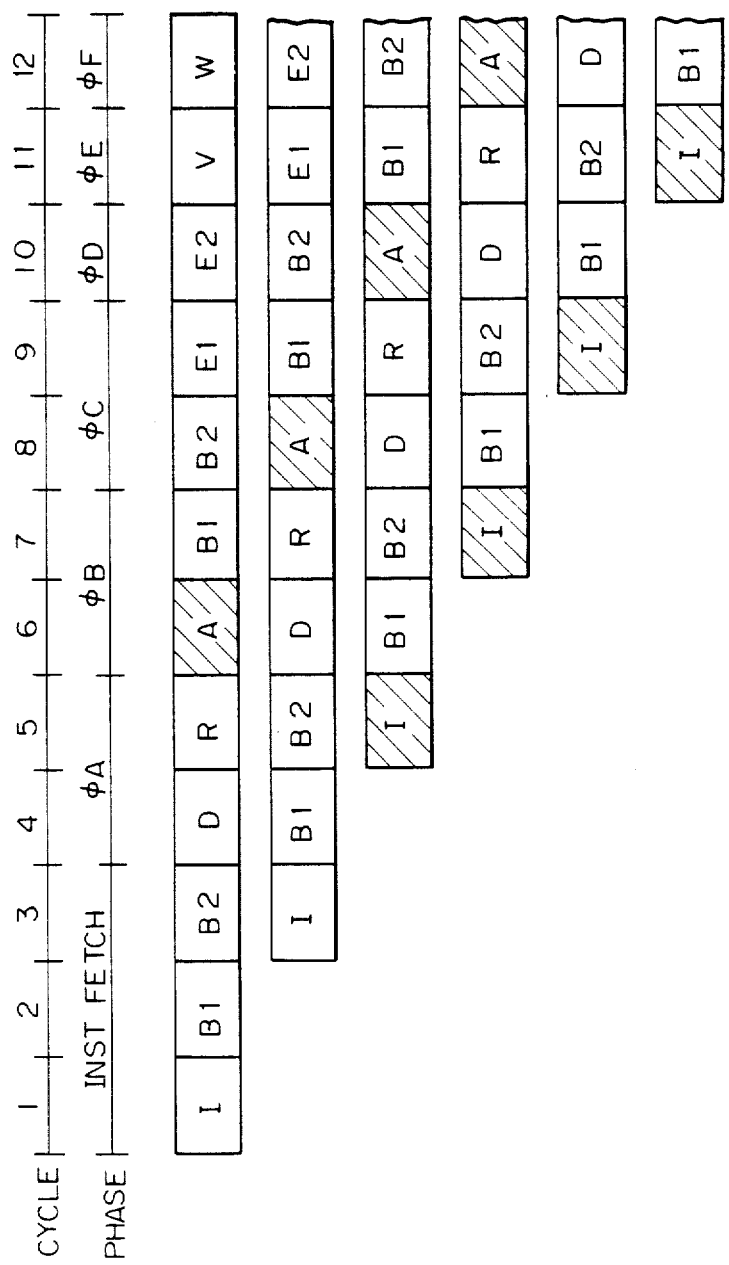
FIG. 4 depicts timing charts explaining a conventional method in which the conflict between the buffer storage accesses is avoided.

FIG. 4 depicts timing charts explaining a conventional method which avoids the above conflict in effecting the buffer storage accesses. According to the known method of avoiding this conflict in the buffer storage accesses, the execution of successive instructions is started at every two cycles, as illustrated in FIG. 4, and thereby, none of the A cycles overlap with the I cycles.

In the CPU operated under the method of FIG. 4, if the successive instructions are sequentially supplied, at every cycle one by one, to the CPU pipeline, the operating speed of the CPU would be doubled. However, if the successive instructions are generated at every cycle, there would be very high probability of producing the aforesaid conflict between the cycles A and I. In this case, even if two instructions are inserted in every cycle I, the thus operated CPU would not achieve higher processing capability than that obtained by inserting one instruction per every 1.5 cycles.

Under such circumstances, in order to increase the processing capability of a CPU, a CPU has been proposed in, for example, "NIKKEI ELECTRONICS 5-11, 1981 No. 264 pages 174 to 200", published in Japan, which contains a buffer storage comprised of a buffer storage for accessing operands and another buffer storage for fetching instructions separately, and accordingly, these two storages can operate independently, i.e., separate buffer storages are used. However, a problem arises in a CPU having the above separated buffer storages, in that particular control must be employed for the two buffer storages. This is because the gist of a block stored in one of the buffer storages must be always the same as the gist of the related block stored in the other buffer storage, where the block is usually segmented in a unit of 32 bytes or 64 bytes. It is to be noted that the above-mentioned operation resembles that of a conventional data coincidence control achieved between one buffer storage and the other buffer storage in a multi-CPU system with two CPU's each having its own buffer storage.

Figure 5:
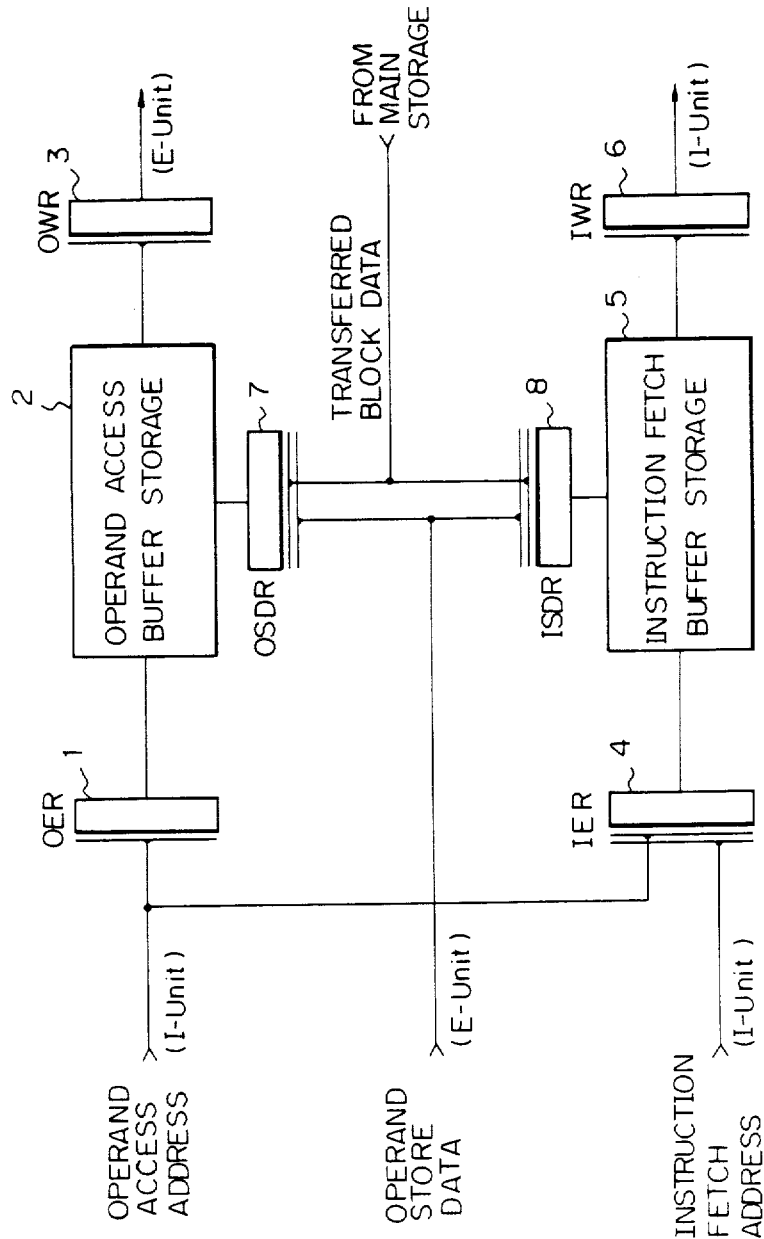
FIG. 5 illustrates a known buffer storage system.

FIG. 5 illustrates a known buffer storage system. The separated buffer storages, mentioned before, are illustrated as an operand access buffer storage 2 and an instruction fetch buffer storage 5. The operand access buffer storage 2 cooperates with an operand effective address register (OER) 1, an operand word register (OWR) 3, and an operand store data register (OSDR) 7. The instruction fetch buffer storage 5 cooperates with an instruction effective address register (IER) 4, an instruction word register (IWR) 6, and an instruction store data register (ISDR) 8.

An operand access address, for example, an operand fetch address, is sent from the instruction unit (I-Unit) and loaded in the operand effective address register (OER) 1. With the thusly loaded address, the operand access buffer storage 2 is accessed to produce read data. The read data is stored in the operand word register (OWR) 3 and then sent to the execution unit (E-Unit).

Similarly, an instruction fetch address is sent from the instruction unit (I-Unit) and loaded in the instruction effective address register (IER) 4. With the thusly loaded address, the instruction fetch buffer storage 5 is accessed to produce read data. The read data is stored in the instruction word register (IWR) 6 and then returned to the instruction unit (I-Unit).

The operand access address is either the aforesaid operand fetch address or an operand store address. When an operand store address is sent from the I-Unit, it is loaded in both the OER 1 and the IER 4, simultaneously. In this case, it is determined whether the block specified by the operand store address exists not only in the buffer storage 2, but also in the buffer storage 5. The above investigation is necessary since, even though instructions are disposed at the head of the block, there is a possibility that data is also contained in the remaining part of the block and, further that, an instruction data itself can be an operand data for another instruction data. If the related block exists in the buffer storage 5, the related operand store data sent from the execution unit (E-Unit) is loaded not only in the OSDR 7 but also in the ISDR 8, so that the related operand store data is written in the related block of each of the buffer storages 2 and 5. On the other hand, when the operand fetch or the instruction fetch is to be achieved, but no related address exists in the corresponding buffer storage 2 or 5, a demand for transferring the related block is applied to the main storage. Then the thus transferred block data from the main storage is written in the corresponding buffer storage 2 or 5.

As previously mentioned, the known buffer storage system (refer to FIG. 5) produces the problem in that the effective operating speed of the CPU cannot be made sufficiently high, and therefore, the capability of the CPU cannot be increased to any large degree, even though independent buffer storages 2 and 5 for accessing operands and fetching instructions are introduced.

Figure 6:
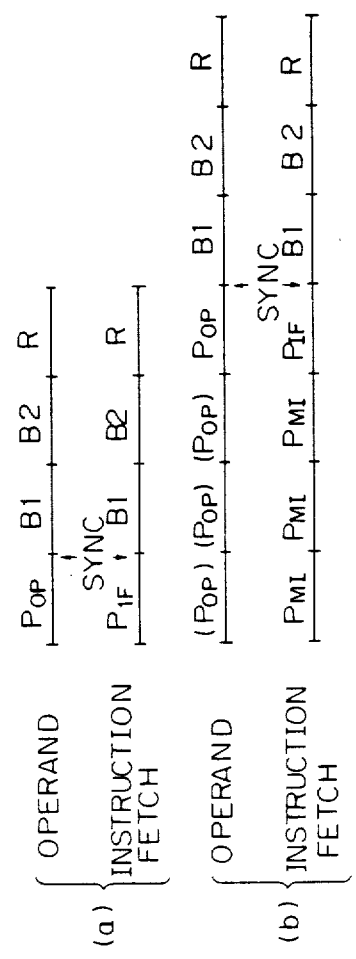
FIG. 6 depicts timing charts explaining the S-Unit pipeline.

The above-mentioned problem will be explained with reference to FIG. 6. FIG. 6 depicts timing charts explaining the S-Unit pipeline. As is apparent from row (a), in the prior art buffer storage system (refer to FIG. 5), the S-Unit pipeline which accesses the storage 2 during the operand (OP) store operation in the sequence $P_{OP}$, B1, B2, and R, and the other S-Unit pipeline which accesses the storage 5 during the instruction fetch (IF) operation in the sequence $P_{IF}$, B1, B2 and R, must be synchronized with each other. If the priorities for both the operand and the instruction fetch are taken at the same time, as shown in row (a), the accessing of the storages 2 and 5 starts immediately. However, if the instruction fetch buffer storage 5 is being used for coping with a request for a block transfer (Move-In), since the priority $P_{MI}$ is usually higher than $P_{IF}$, the instruction fetch having the priority $P_{IF}$ must wait for three cycles, for example, until the last priority step $P_{MI}$ is completed, as shown in row (b). In this case, the priority $P_{OP}$ for accessing the storage 2 must also wait during the idle operand cycles ($P_{OP}$ in parentheses), to assure synchronization between the operand access and the instruction fetch. Thus, the operating speed of the known CPU cannot be sufficiently increased.

According to the buffer storage system of the present invention, the above synchronization is not needed, since means are introduced for effecting a feedback of the operand store information to the instruction fetch buffer storage into the buffer storage system by momentarily holding both the address and data in a store buffer register. The store buffer register is usually inherent to a CPU operated under a store-through method. Therefore, the present invention is preferably applied to such a CPU, i.e., a CPU containing therein at least the store buffer register. As is known, under the store-through method, both the operand store address and the operand store data are applied to the operand store registers and, at the same time, to the store data registers, and are momentarily held therein. Then the related address and data are also transferred to the main storage which is usually operated at relatively low speed, but which has a large capacity.

Figure 7:
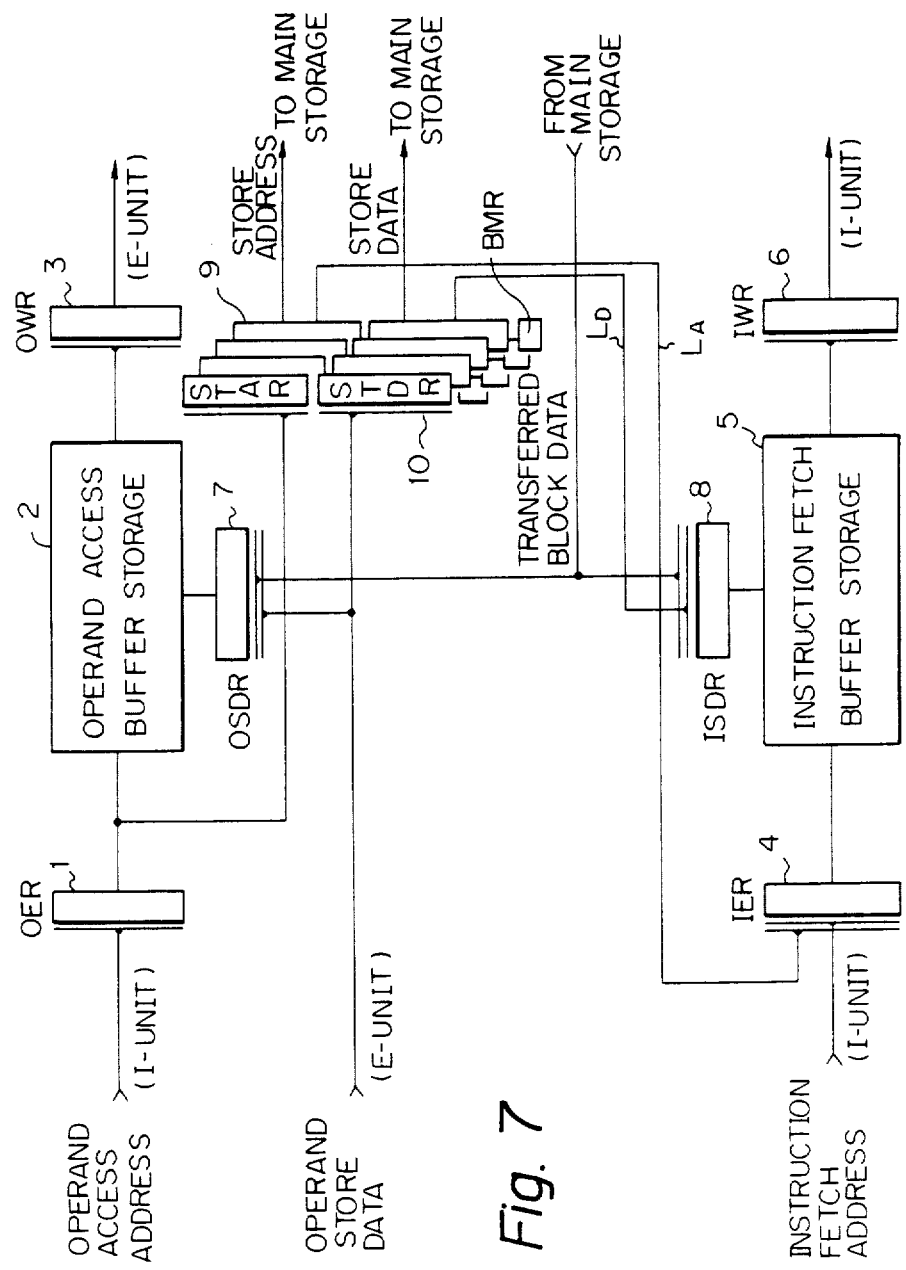
FIG. 7 illustrates a buffer storage system according to an embodiment of the present invention.
Figure 8B:
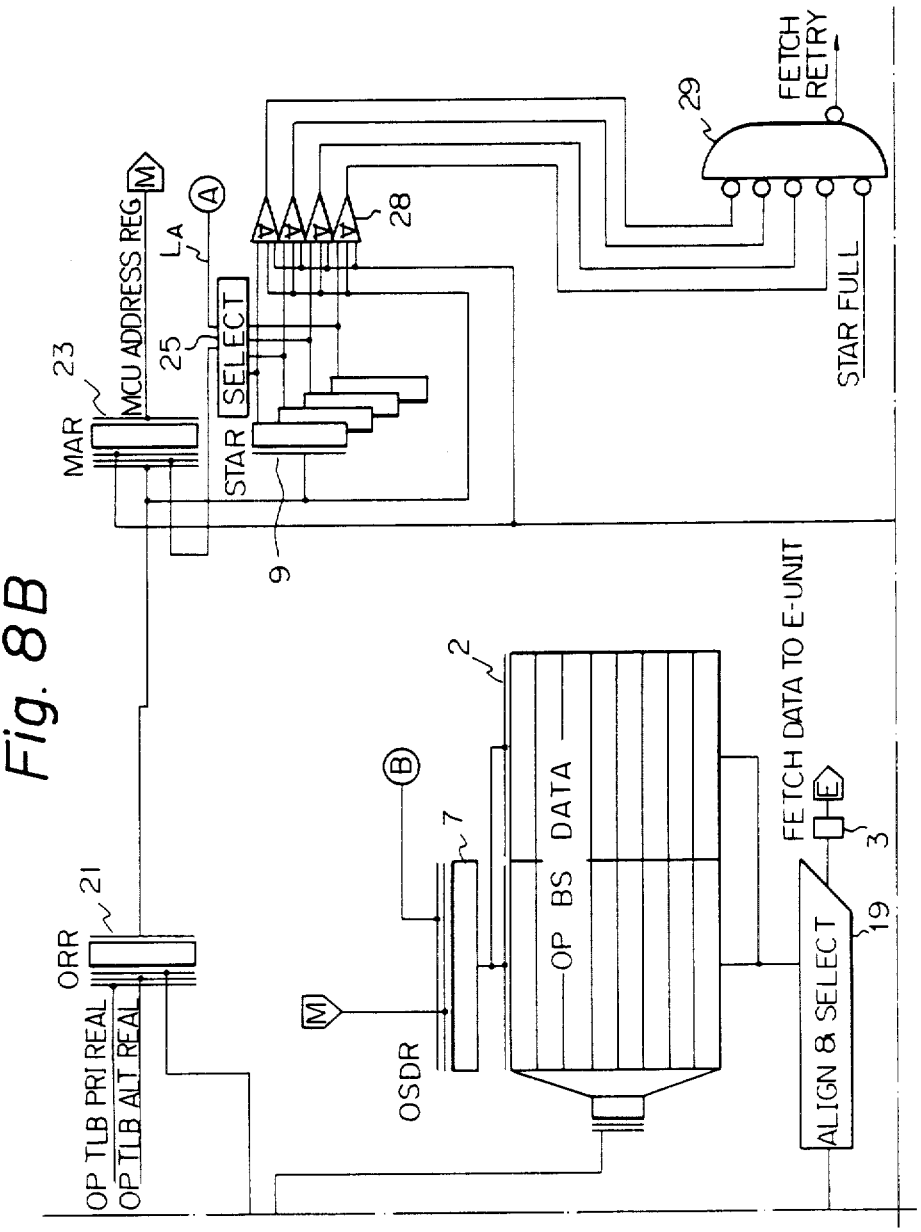
Figure 8C:
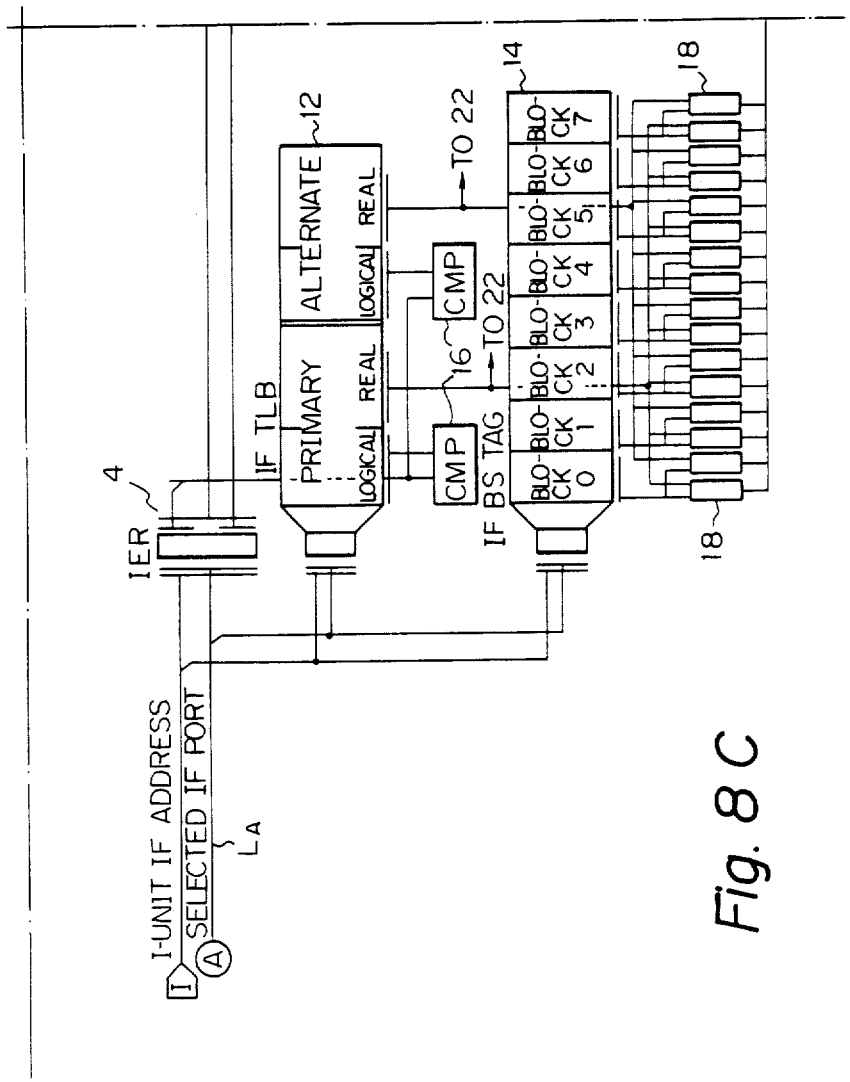
Figure 8D:
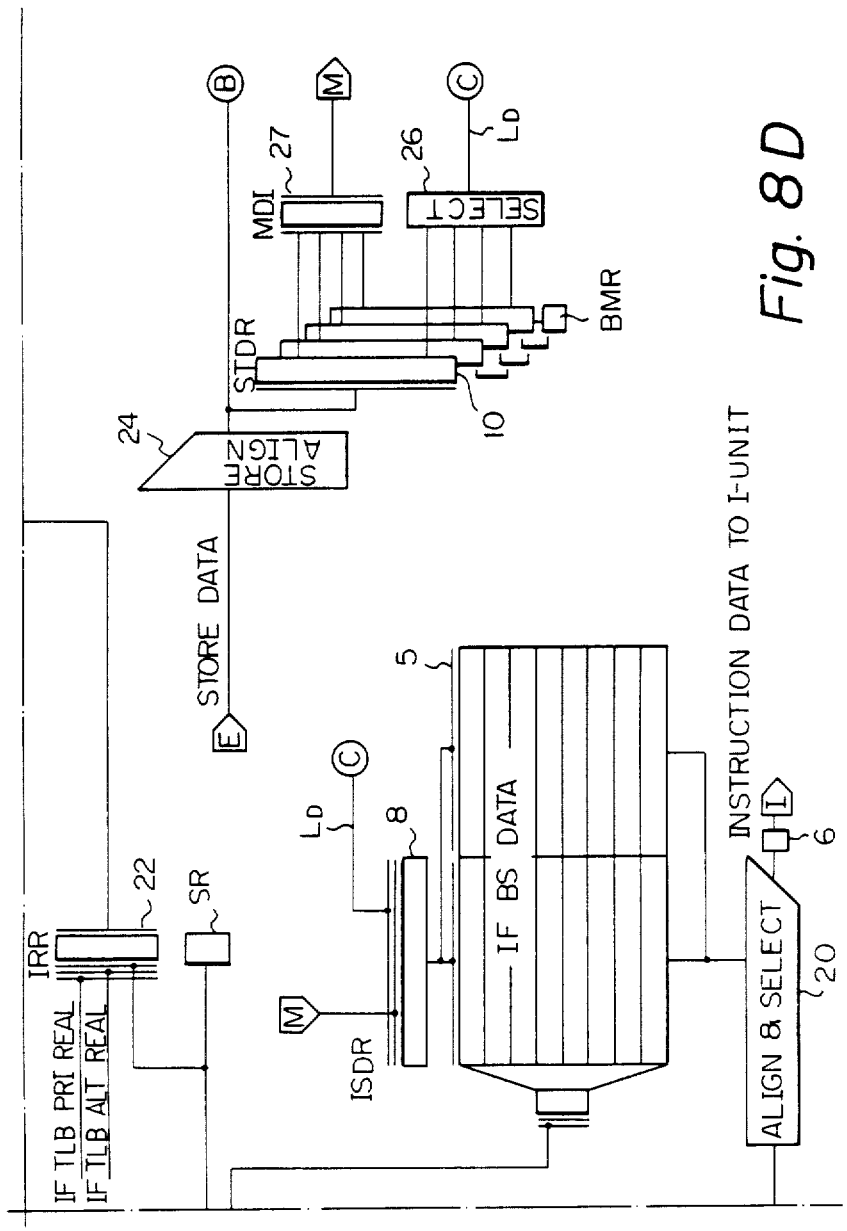

FIG. 7 illustrates a buffer storage system according to an embodiment of the present invention. In FIG. 7 and subsequent figures, members identical to those of the previously described figures are represented by the same reference numerals or symbols. Numerals 9 and 10 denote the aforesaid store buffer register. That is, the store buffer register is comprised of store address registers (STAR) 9 and store data registers (STDR) 10. The operand access address, in this case, the operand store address, is not loaded in the IER 4, as in the known system of FIG. 5, but is loaded in the operand effective address register (OER) 1 only. Then it is determined whether or not the related store address exists in the operand access buffer storage 2. If it does, the related operand store data, which is loaded in the operand store data register (OSDR) 7, is written in the buffer storage 2. (The above determination will be explained in more detail hereinafter.) At the same time, the operand store address is applied from the OER 1 to one of the store address registers (STAR) 9 and loaded therein. On the other hand, the operand store data is loaded in the corresponding one of the store data buffer registers (STDR) 10 and also a byte mark (mentioned hereinafter) is set in the corresponding one of the byte mark registers (BMR). Thereafter, a request for write into the main storage is generated.

The operand store address, loaded in one of the store address buffer registers (STAR) 9, is fed back to the instruction effective address register (IER) 4 by a feedback means which is a feature of the present invention. Then it is determined whether or not the related address exists in the instruction fetch buffer storage 5, in a manner clarified hereinafter. If it does, the operand store data, set in one of the STDR 10, is applied to the instruction store data register (ISDR) 8 by using the above-mentioned feedback means, and then the operand store data is written in the instruction fetch buffer storage 5. The feedback means can be realized specifically with an address bus line $L_A$ and a data bus line $L_D$, and thus requires no complicated hardware. Consequently data coincidence can be achieved.

As is clear from the above explanation with reference to FIG. 7, the operand store access can be dealt with by using the feedback means without establishing synchronization between the operand access pipeline and the instruction fetch pipeline, as must be done in the known system of FIG. 5. This is because the operand access address and the operand data can be fed back to the buffer storage 5, by utilizing the same address and data which are set necessarily in the store buffer registers 9 and 10 under the store-through method. Further, the S-Unit pipeline and the CPU pipeline (refer to FIG. 3) can run asynchronously.

FIGS. 8A to 8D show a detailed circuit diagram of the buffer storage system shown in FIG. 7. In these figures, the operand access address (I-UNIT OP ADDRESS) and the instruction fetch address (I-UNIT IF ADDRESS) are sent from the instruction unit (I-Unit) and loaded in the operand effective address register (OER) 1 and the instruction effective address register (IER) 4, respectively. At the same time, the operand access address is applied to both an operand address conversion buffer (OP TLB) 11 and to an operand access buffer storage (BS) tag (OP BS TAG) 13. Also, at the same time, the instruction fetch address is applied to both an instruction address conversion buffer (IF TLB) 12 and to an instruction fetch buffer storage tag (IF BS TAG) 14. In the buffer (OP TLB) 11, a logical address is converted into a real address at high speed. This is also true for the buffer (IF TLB) 12 (TLB is an abbreviation of a known term "Translation Look-aside Buffer"). With the thus translated real address from the buffer (OP TLB) 11, the tag (OP BS TAG) 13 is accessed. This is also true for the buffer (IF TLB) 12 and the tag (IF BS TAG) 14. Each of the tags (BS TAG) 13 and 14 hold block addresses of the corresponding buffer storages (2, 5).

The logical addresses read from the buffers (TLB) 11 and 12 are applied to comparing circuits (CMP) 15 and 16, respectively, to determine whether the logical addresses correspond to the given addresses, respectively. At the same time, the related real addresses are applied to comparators 17 and 18, at each right side input thereof, respectively. On the other hand, the block addresses held in the tags 13 and 14 are applied to the comparators 17 and 18, at each left side input, respectively. Thus, the real addresses and the block addresses are compared with each other at the sixteen comparators 17 and the sixteen comparators 18. When a coincidence signal is produced from one of the comparators 17, the coincidence signal triggers an alignment and selection circuit (ALIGN & SELECT) 19, to obtain output data from the operand access buffer storage 2. The thus-obtained data is transferred, as an operand data, to the execution unit (E-Unit).

In a similar manner, when a coincidence signal is produced from one of the comparators 18, the coincidence signal triggers an alignment and selection circuit (ALIGN & SELECT) 20, to obtain output data from the instruction fetch buffer storage 5. The thusly obtained data is transferred, as an instruction data, to the instruction unit (I-Unit). Each of the circuits 19 and 20 operates to determine which 8 byte data, among 64 byte data, should be selected.

An operand real register (ORR) 21 receives the real address produced from either the primary part (PRIMARY) or the alternate part (ALTERNATE) of the buffer (OP TLB) 11, if the comparing circuit 15 detects an occurrence of the aforesaid coincidence. When the corresponding block does not exist in the buffer storage 2, the thusly received real address is used to load a concerned request address for the main storage into an MCU address register (MAR) 23. In a similar manner, an instruction real register (IRR) 22 receives the real address produced from either the primary part (PRIMARY) or the alternate part (ALTERNATE) of the buffer (IF TLB) 12, if the comparing circuit 16 detects an occurrence of the aforesaid coincidence. When the corresponding block does not exist in the buffer storage 5, the thusly received real address is used to load a concerned request address for the main storage into the MCU address register (MAR) 23. The above-mentioned primary part and alternate part are useful for performing two-way access. Two-way access is obviously more convenient than one-way access, using only the primary part, from the viewpoint of access efficiency.

The operand store address is, on one hand, loaded in the operand effective address register (OER) 1 and, on the other hand, used for accessing the buffer (OP TLB) 11 and also the tag (OP BS TAG) 13, as mentioned previously, to determine whether or not the block to be stored exists in the operand access buffer storage 2. At this time, the real address from the buffer (OP TLB) 11 is held, as a store address for the main storage, in one of the registers (STAR) 9, via the register (ORR) 21.

The operand store data (STORE DATA) is sent from the execution unit (E-Unit) and loaded in one of the store data registers (STDR) 10. This register is selected by a store-alignment circuit (STORE ALIGN) 24. The store data is written, from the operand store data register (OSDR) 7 and via the store-alignment circuit 24 and port "B", to the operand access buffer storage 2.

FIG. 9 is a schematic illustration of the store buffer register. The store buffer register (STB) has four parts, i.e., STB1 through STB4. Each of the four parts is comprised of each store address register (STAR) 9, each store data register (STDR) 10, and each byte mark register BMR. Each STAR stores therein the real address (STB ADDRS) for store access to the main storage; each STDR stores therein the 8 byte data (STB DATA); and each BMR stores therein the byte mark (BM) which indicates the byte location of the data in the STDR. This BM is available when a partial data write, having a size smaller than 8 bytes, is to be achieved for the main storage. The symbol "V" denotes a valid flag indicating that the address is stored in the STAR. The symbol "R" denotes a ready flag indicating that the data is stored in the STDR. The flags V and R are stored in each flag register FR.

The four parts of the store buffer registers STB1 through STB4 are used sequentially and cyclically every time a store access is generated. When the last store buffer register, i.e., STB4, is used, the first store buffer register, i.e., STB1, is used again if a certain condition stands wherein the contents of the store buffer registers STB1 through STB3 have already been shunted to the main storage.

Returning to FIGS. 8A to 8D, a selection circuit (SELECT) 25 selects one of the registers (STAR) 9, and the thusly selected real address stored therein is loaded, via a port "A" and the bus line $L_A$, in the instruction effective address register (IER) 4, thereby completing the aforesaid feedback to the instruction fetch buffer storage 5 for the address. At the same time, the tag (IF BS TAG) 14 is accessed by the selected real address to determine whether or not the related block exists in the buffer storage 5. In this case, the address to be set in the IER 4 is a real address, and therefore, the address of the IER 4 is directly applied, without referring to the buffer (IF TLB) 12, to the comparators 18.

If the related store address exists in the instruction fetch buffer storage 5, the related store data held in the corresponding one of the registers (STDR) 10 is selected by a selection circuit (SELECT) 26. The thusly selected store data with the corresponding byte mark BM is applied to the instruction store data register (ISDR) 8 via a port "C" and the bus line $L_D$, and then written in the storage 5, thereby completing the aforesaid feedback to the instruction fetch buffer storage 5 for the data. At this time, the store address is sent, via the selection circuit 25, to the MCU address register (MAR) 23 and loaded therein. Then the thusly set store address is sent to the main storage. At this time, the related store data in the corresponding one of the store data buffer registers (STDR) 10 is sent, as write data, to the main storage, via an MCU data in register (MDI) 27.

It may happen that an instruction fetch address is loaded in the instruction effective address register (IER) 4 after the operand store address is loaded in the STAR 9 but before the feedback to the instruction fetch buffer storage 5 is completed, and that the above-mentioned instruction fetch address is the same as the store address loaded in the IER 4. In this case, the corresponding real address of the sent instruction fetch, loaded in the instruction real register (IRR) 22, is compared with the real addresses, and loaded in the registers (STAR) 9, by the comparators 28. Note, the output applied from the ORR 21 to each comparator 28 is irrelevant to the essence of the present invention. If one of the comparators 28 produces a coincidence signal, a logic gate, such as a NAND gate 29, is opened by the coincidence signal to produce a retry signal. This retry signal is needed because, in the above-mentioned case, the store address and the corresponding store data have been sent to the main storage, however, the same store address and the store data have not yet been fed back to the instruction fetch buffer storage 5. Accordingly, at this time, the data of the corresponding block in the main storage is different from the data of the same block in the buffer storage 5. Therefore, if the same instruction fetch address is sent, at this time, to the buffer storage 5, the read data from the buffer storage 5 is necessarily different from that of the main storage. Thus, in such a case, a retry operation must be performed by the retry signal produced from a retry means to avoid noncoincidence of the data. The retry signal can be sent to the instruction unit (I-Unit) to command the retry operation. Alternatively, the retry signal can be used for effecting the instruction fetch operation again for the buffer register 5 by utilizing the conflicting address saved momentarily in a save register SR. Nevertheless, the retry operation must be repeated until the conflicting address is completely removed from the STAR 9.

The retry operation is also required in the following case. When the four registers (STAR) 9 are all in use, there is no capacity for setting a newly sent operand store address therein. In such a case, the aforesaid address comparison by the comparators 28 can no longer be carried out, and accordingly, it is impossible to maintain a sequence between the series of the operand store addresses and the series of the instruction fetch addresses. To maintain the sequence normally, the process for the instruction fetch access must be stopped until the registers (STAR) 9 are ready to receive the next operand store address, that is, a signal "STAR FULL" input to the NAND gate 29, has stopped, and therefore, the retry signal for effecting the instruction fetch access is stopped.

According to another type of buffer storage system of the present invention, the feedback means is realized without using the bus lines $L_A$ and $L_B$ as shown in FIG. 7. In this buffer storage system, the feedback operation can be equivalently performed by the following. The first step is to erase the old data that is, stored in the instruction fetch buffer storage 5. This can be immediately carried out by invalidation of the related block address in the tag (IF BS TAG) 14. The second step is to transfer the corresponding data from the main storage and replace the erased data therefore. The above-mentioned idea is derived from the fact that, under the store-through method, the main storage always has a copy of the data to be stored in the buffer storage.

Figure 10:
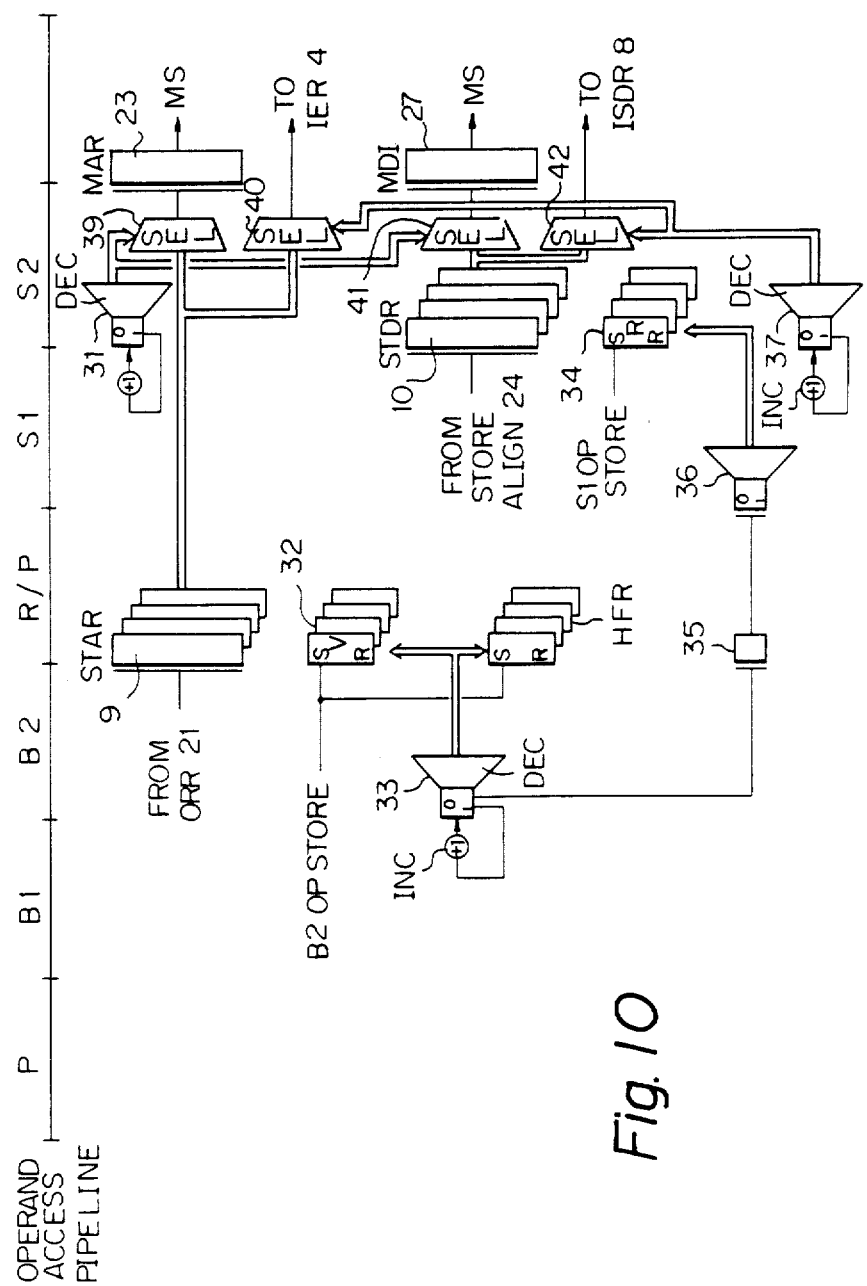
FIG. 10 is a schematic block diagram in relation to the operand access pipeline.

Returning to the buffer storage system of FIGS. 7 to 9, the following will further clarify the control operations therefor. FIG. 10 is a schematic block diagram in relation to the operand access pipeline. The pipeline runs along the cycles P, B1, B2, R/P, S1, S2 - - - . The cycles S1 and S2 particularly indicate store cycles, but identically to B1 and B2. In the first flow, i.e., P→B1→B2→R, the aforesaid access to the buffer (OP TLB) 11 and the tag (OP BS TAG) 13 is achieved to effect the previously mentioned determination. In the second flow, i.e., P→S1→S2, the operand store data is sent from the E-Unit and written in the buffer storage 2. At the cycle R, when the operand store address is sent from the ORR 21 and loaded in one of the registers (STAR) 9, the valid flag V is loaded in valid flag registers 32, which correspond to the flag register FR of FIG. 9. At the cycle S2, when the operand store data is sent from the store-alignment circuit 24 and loaded in one of the registers (STDR) 10, the ready flag R is loaded in ready flag registers 34, which correspond to the flag registers FR of FIG. 9. The operand store address and the operand store data, loaded in the STAR 9 and the STDR 10, respectively, are transferred at the end of the cycle S2 to the MAR 23 and the MDI 27, and then supplied finally to the main storage (MS).

A 2-bit store buffer out-pointer 31 specifies, via selectors 39 and 41, sequentially which one of the registers (STAR) 9 and which one of the registers (STDR) 10 are to be selected. The out-pointer 31 is comprised of a 2-bit register with an incrementer INC and a decoder DEC. Thus, four stages "00", "01", "10", and "11" are obtained cyclically. A 2-bit store buffer in-pointer 33 specifies sequentially which one of the registers (STAR) 9 is to be selected, together with the valid flag register 32 and registers HFR. A store buffer delay-pointer 36 operates to shift the value of the in-pointer 33 from the cycle B2 to the cycle S1 by way of a latch register 35, and therefore, one of the registers (STDR) 10 corresponding to the selected one of the STAR 9, can be selected.

The operand store address and the operand store data are fed back, via selectors 40 and 42, to the IER 4 and ISDR 8, respectively. The selectors 40 and 41 are controlled by a store buffer pointer 37.

In the buffer storage system, it is difficult to determine the sequence of data transfer timing for the main storage (MS) and store access timing for the instruction fetch buffer storage 5. This is because the transfer of data to the MS is allowed only when the data bus (not shown) is not occupied by other data, and the store access to the buffer storage is allowed only when the pipeline of the instruction fetch side is not busy. Further, there may be a case where, even though the store access is once entered into the instruction fetch pipeline, the store access cannot proceed in accordance with the status of the preceeding request, and thus a retry operation is required for the once-accepted store access.

The above-mentioned problem can be overcome by using, at least, a hold flag, an issue flag, and an identification bit. The hold flag indicates that the store data to be fed back to the buffer storage 5 is held in the store data register 10. The issue flag indicates that the store access for the buffer storage 5 is issued to the instruction fetch pipeline. The identification bit indicates from which one of the store data registers 10 the store data is brought into the instruction fetch pipeline.

Figure 11:
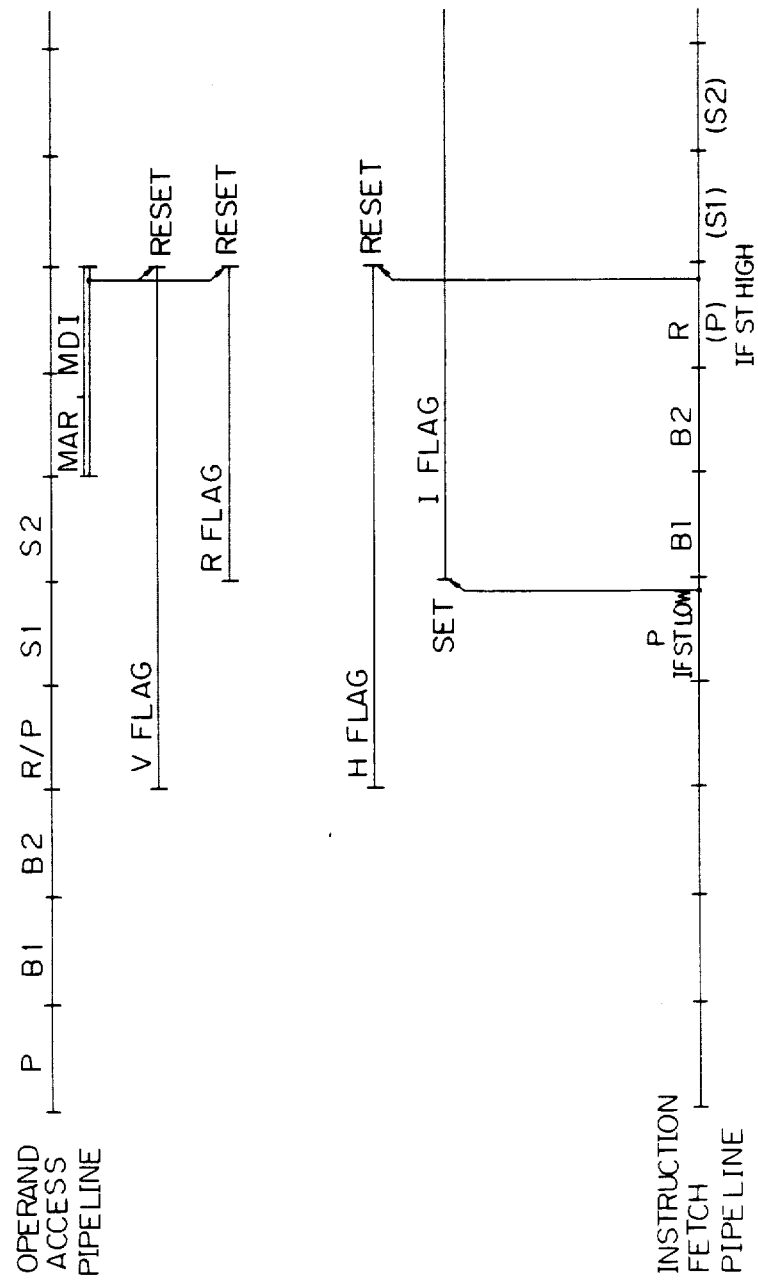
FIG. 11 depicts timing charts explaining various control flags.

FIG. 11 depicts timing charts explaining the various control flags. The hold flag (H FLAG) is set in the same cycle R at which the valid flag (V FLAG) is set. The H flag is supplied from the registers HFR (FIG. 10) and indicates that the operand store access to the instruction fetch buffer storage is now pending. The timing for bringing the data from the store buffer register (9, 10) into the instruction fetch pipeline is determined by the aforesaid store buffer pointer 37 (FIG. 10). If the H flag is set regarding one of the store data registers 10 specified by the pointer 37, a request P (IF STORE LOW) is entered into the instruction fetch pipeline. When the request P (IF ST LOW) takes priority, the instruction fetch pipeline runs therefor. In response to this, the corresponding issue flag (I FLAG) is set, which means that the operand store access is activated for the instruction fetch buffer storage 5.

Figure 12:
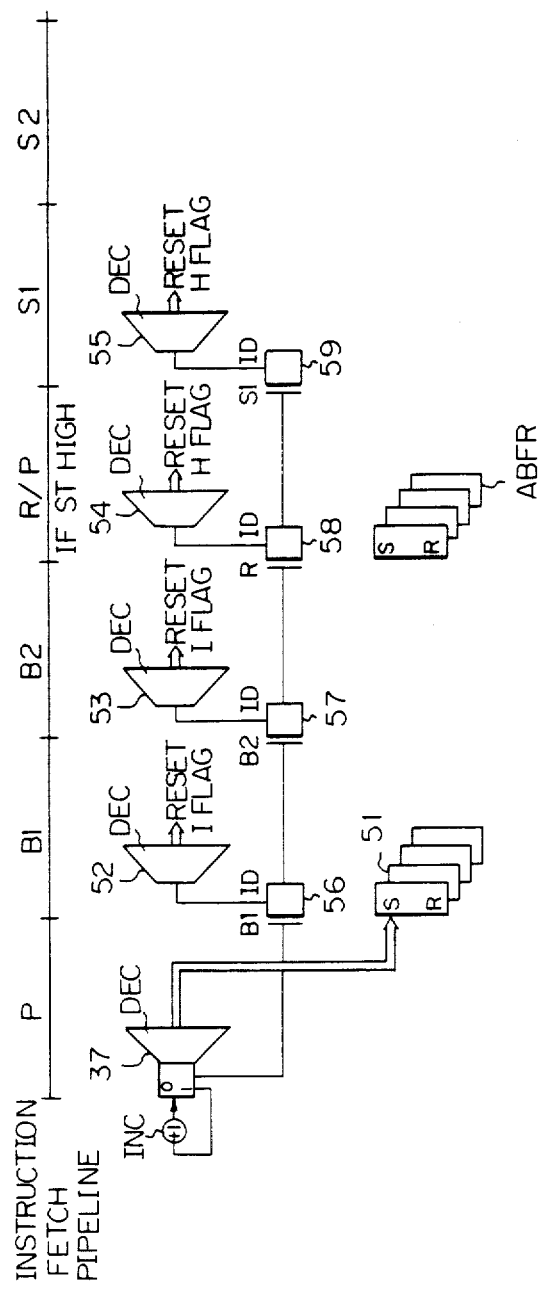
FIG. 12 is a schematic block diagram in relation to the instruction fetch pipeline.

FIG. 12 is a schematic block diagram in relation to the instruction fetch pipeline. During a transition of the request (IF ST LOW) from the cycle P to the cycle B1, the I FLAG is set in correspondence to the I flag registers 51, which register is specified by the store buffer pointer 37. At the same time, the identification bit (ID) is set in an identification register (B1-ID) 56. The ID indicates from which parts of the store buffer register (9, 10) the store access is generated. This identification bit (ID) is sequentially shifted through the identification registers, i.e., B2-ID57→R-ID58→S1-ID59.

At the cycle R, if it is found that no corresponding address block to be stored exists in the buffer storage 5, the H flag is reset at the end of the cycle R. The H flag to be reset is specified, via a decoder (DEC) 54, by the gist of the register (R-ID) 58. Inversely, if the corresponding address block exists therein, a request P (IF STORE HIGH) is generated as shown in the bottom row of FIG. 11. Then the corresponding write operation for the store is started. In this case, the identification bit ID is indicated by the register (S1-ID) 59, which ID specifies the corresponding one of the store data registers 10. The corresponding H flag to be reset is then specified by the output from the decoder 55. During the set state of the H flag, the H flag indicates that the store data is not yet fed back to the buffer storage 5. Accordingly, the H flag is utilized as a control signal for commanding the comparators 28 to compare both the real address of the instruction fetch, held in the instruction real register (IRR) 22, and the real store address, held in the STAR 9. During the reset state of the H flag, the result from each comparator 28 is ignored.

Figure 13:
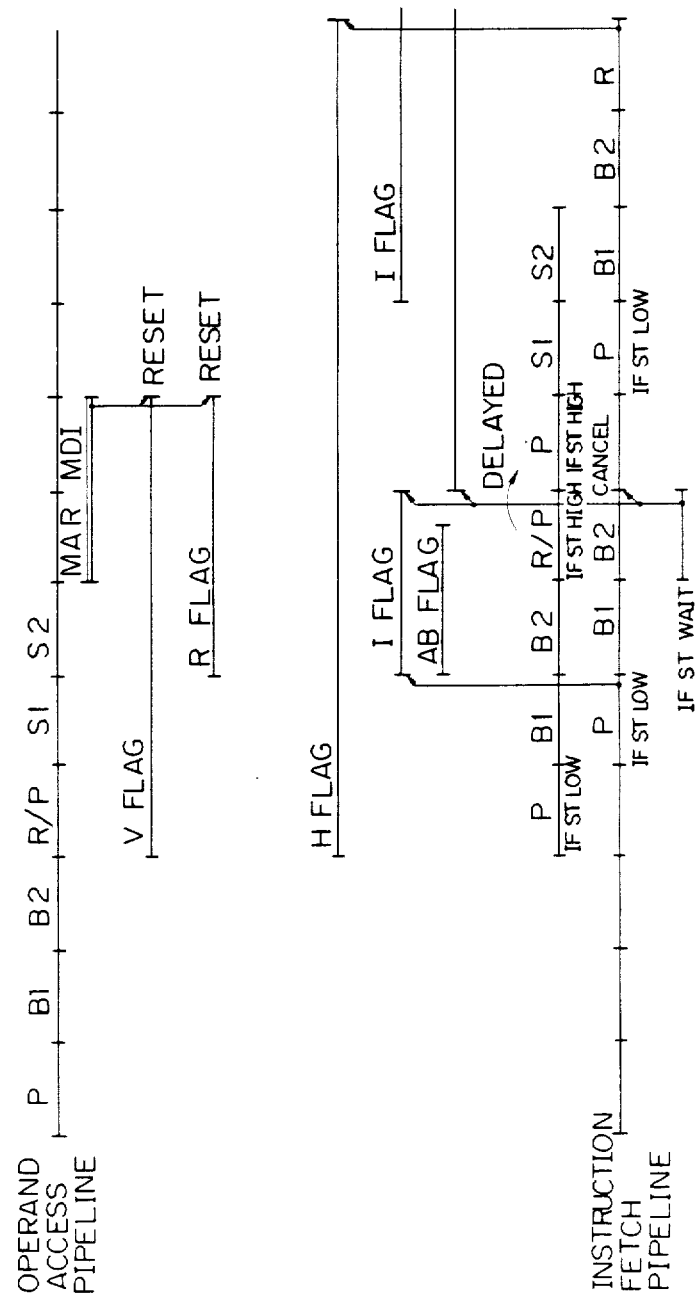
FIG. 13 depicts timing charts explaining various control flags, in particular where the store access is cancelled, in relation to the S-Unit pipelines.

FIG. 13 depicts timing charts explaining various control flags, in particularly a case where the store access is cancelled, in relation to the S-Unit pipelines. During the aforementioned store access entered into the instruction fetch pipeline, if the address block under the preceding request P (IF ST LOW) exists in the buffer storage 5, an actual write operation for the store request must be soon started. At this time, if the request P (IF ST HIGH) can take priority soon, there would be no problem. However, if the request P (IF ST HIGH) is delayed by one cycle (refer to DELAYED), the following request P (IF ST LOW) is entered into the cycle R. Therefore, information to be used in the request P (IF ST HIGH), would be rewritten, as not intended, and thus, the following request must be cancelled at the end of the cycle B2. Under these circumstances, it should be controlled in such a manner that the previously activated store access is regenerated. With reference to FIG. 13, the case concerned occurs at the cycles B1 and B2. In this case, with reference back to FIG. 12, the outputs from the registers B1-ID46 and B2-ID47 are used, via the decoders 42 and 43, to reset the respective H flags in which the I flag is reset but the H flag is maintained in a set state. The pointer 37 is incremented by one every time the store access is brought into the instruction fetch pipeline, while the pointer 37 is controlled so as to enter the request P (IF ST LOW) again into the instruction fetch pipeline when it is found that the store buffer registers (9, 10), having the H flag set and the I flag being reset, exist. In this case, the pointer 37 produces points cyclically, such as 0→1→2→3→0→1- - -. Accordingly, when the above mentioned reentry of the request P (IF ST LOW) into the pipeline is performed, it is not always guaranteed that the order in entering the data into the store buffer register (9, 10) is matched with the order to the feedback routine to the instruction fetch buffer storage tag (IF BS TAG) 14. Therefore, in this case, the previously mentioned invalidation for the tag 14 is to be carried out to establish a data coincidence between the buffer storage 5 and the main storage. In order to instruct which invalidation to the four parts of the store buffer registers, each of these four parts is provided with an instruct fetch store aborted flag (AB FLAG). The AB flag, in registers ABFR (FIG. 12), is set at the same time that the corresponding I flag is reset. Thus, the operand store access to the buffer storage 5 can be handled with no contradiction in operations.

As explained above in detail, according to the present invention, a buffer storage system is realized that can run both the operand access pipeline and the instruction fetch pipeline asynchronously, and as a result, the CPU can be operated at a higher speed than that of a CPU having a buffer storage system operated in a synchronization state.

I claim:

1. A buffer storage system operatively connected with an instruction unit, an execution unit, and a main storage to set up a pipeline processor, comprising:
   operand access buffer storage means for storing operand data accessed by an operand store address or an operand fetch address from said instruction unit and transferring the accessed operand date therefrom to said execution unit;
   instruction fetch buffer storage means for storing instruction data accessed by an instruction fetch address from said instruction unit and transferring the accessed instruction data to said instruction unit;
   feedback register means, operatively connected to said operand access buffer storage means, for temporarily storing the operand store address and the operand data and comprising store address register and store data registers, activated during an operand store operation, wherein said operand store address and corresponding operand data, respectively, sent from said execution unit are buffered and then transfered to said main storage by said information register means to provide a store-through method; and
   feedback means, operatively connected between said feedback register means and said instruction fetch storage means, for applying the buffered operand store address and operand data, temporarily stored in said store address registers and said store data registers, respectively, to said instruction fetch buffer storage.

2. A system as set forth in claim 1, wherein said feedback means comprises an address bus line and a data bus line, each connected to said instruction fetch buffer storage means, and respectively to said store address register and store data register of said feedback register means.

3. A system set forth in claim 2, comprising:
   wherein said operand access buffer storage includes an operand store data register for momentarily holding operand store data transferred from said main storage or said operand store data,
   wherein said instruction fetch buffer storage means includes an instruction effective address register connected to said feedback means and an instruction store data register connected to said feedback means and said operand store data register,
   wherein said operand store address is transferred via said address bus line and used as said instruction fetch address, and
   wherein said operand store data is selectively transferred via said data bus line and used as said instruction data, and
   wherein and said operand store data is momentarily held in said instruction store data register.

4. A system as set forth in claim 3, further comprising retry means operatively connected to said operand access buffer storage means and said instruction fetch buffer storage means for producing a retry signal for commanding a retry of the related instruction fetch operation, when an instruction fetch address is loaded in said instruction effective address register after the operand store address is loaded in said store address register, but before the feedback to the instruction fetch buffer storage by said feedback means is completed, and said instruction fetch address is the same as the operand store address loaded in any one of said store address registers.

5. A system as set forth in claim 4, further comprising control means for controlling pipeline accesses and
   wherein said retry means includes a logic gate having a plurality of inputs and an output, connected to said control means, for producing said retry signal; and
   said system further comprising a plurality of comparators, connected to said store address register and said instruction effective address register, respectively connected to the inputs of said logic gate to receive, at respective first comparing inputs, respective outputs from said store address registers and, at respective second comparing inputs, the outputs from said instruction effective address register.

6. A system as set forth in claim 5, further comprising means, operatively connected to said store address registers and said logic gate, for producing a full signal indicating that all said store address registers are full of respective operand store addresses, wherein said full signal is applied to a further one of said inputs of said logic gate to cause said retry signal to be produced.

7. A system as set forth in claim 6, wherein said feedback registers means includes a save register connected to said instruction effective address register for storing the respective instruction fetch address for performing said retry operation.

8. A system as set forth in claim 6, wherein said control means includes control registers for controlling the operation of said operand access buffer storage, instruction fetch buffer storage, information register and feedback means.

9. A system as set forth in claim 8,
wherein said control registers include VR flag registers and BM registers;
wherein each said store address register and a corresponding store data register includes a store buffer register connected between said operand buffer storage and said instruction fetch buffer storage, so that a plurality of such store buffer registers are provided for each pair of said store address and store data registers; and
wherein each of said store buffer registers includes one each of said VR flag and BM registers;
wherein each of the VR flag registers stores therein a valid flag V, and a ready flag R, and each of the BM registers stores therein a byte mark BM, each said V flag indicating that the operand store address has been stored in the corresponding one of said store address registers, each said R flag indicating that the operand store data has been stored in the corresponding one of said store data registers, and each said byte mark indicating a byte location of the operand store data in said store data register.

10. A system as set forth in claim 9, wherein said control registers include H flag registers and I flag registers connected between said operand buffer storage and said instruction fetch buffer storage,
wherein wherein each of said H flag registers stores therein a hold flag H for indicating that the operand store data to be fed back to said instruction fetch buffer storage is being held in one of said store data registers, and each of the I flag registers stores an issue flag I for indicating that the operand store access to the instruction fetch buffer storage has been issued to the instruction fetch pipe-line.

11. A system as set forth forth in claim 10,
wherein said control registers include identification bit registers, connected to said store data registers for indicating from which one of the store data registers the operand store data is to be brought into said instruction fetch pipeline.

12. A system as set forth in claim 11, further comprising pointers, connected to said control registers, that are synchronized with the advance of said identification bit, each including an incrementer to produce cyclic pointing addresses sequentially, wherein said control registers are cyclically sequentially selected.

13. A system as set forth in claim 1, wherein said feedback means comprises:
address and data storage registers connected to said operand access register and to receive the operand data;
an address line connected between the address storage register and said instruction access register; and
a data line connected between the data storage register and said instruction storage register.

14. A buffer storage and operand accessing system, comprising:
an operand pipeline storing operand data and including:
an operand access register receiving an operand access address;
an operand storage register receiving operand data to be stored; and
an operand buffer storage, operatively connected to said operand access register and said operand storage register, for storing operand data supplied by said operand storage register and addressed by said operand access register;
an instruction pipeline storing instructions and operand data and including:
an instruction access register for receiving operand data and an address for accessing instructions; a instruction storage register receiving contents to be stored in said instruction pipeline; and
an instruction buffer storage, operatively connected to said instruction access register and said instruction storage register, for storing instructions and operand data; and
feedback means, operatively connected to said operand access register and to receive the operand data, and to said instruction address register and said instruction storage register, for supplying the operand access address and operand data to said instruction address register and instruction storage register, respectively, when the operand address is not found in said operand buffer storage, thereby searching the instruction buffer storage for the operand address.

* * * * *

UNITED STATES PATENT AND TRADEMARK OFFICE
CERTIFICATE OF CORRECTION

PATENT NO. : 4,713,752

DATED : December 15, 1987

INVENTOR(S) : Hirosada Tone

It is certified that error appears in the above-identified patent and that said Letters Patent is hereby corrected as shown below:

Col. 13, line 36, delete "wherein" (first occurrence).

Col. 14, line 32, "a" should be --an--.

Signed and Sealed this

Fifth Day of July, 1988

*Attest:*

DONALD J. QUIGG

*Attesting Officer*     *Commissioner of Patents and Trademarks*